US010132550B2

(12) United States Patent
Urbain

(10) Patent No.: US 10,132,550 B2
(45) Date of Patent: Nov. 20, 2018

(54) AIR-CONDITIONING UNIT AND METHOD

(71) Applicant: LEBRUN-NIMY EN ABREGE LEBRUN SA, Nimy (BE)

(72) Inventor: Claudy Christian Urbain, Waudrez (BE)

(73) Assignee: LEBRUN-NIMY EN ABREGE LEBRUN SA, Nimy (BE)

( * ) Notice: Subject to any disclaimer, the term of this patent is extended or adjusted under 35 U.S.C. 154(b) by 753 days.

(21) Appl. No.: 14/615,372

(22) Filed: Feb. 5, 2015

(65) Prior Publication Data

US 2015/0153092 A1 Jun. 4, 2015

Related U.S. Application Data

(63) Continuation of application No. 12/301,357, filed as application No. PCT/EP2007/054840 on May 18, 2007, now Pat. No. 9,016,087.

(30) Foreign Application Priority Data

May 19, 2006 (EP) ...................................... 06114251

(51) Int. Cl.
*B64F 1/36* (2017.01)
*F25D 17/06* (2006.01)
(Continued)

(52) U.S. Cl.
CPC .............. *F25D 17/06* (2013.01); *F24F 1/025* (2013.01); *F25B 29/003* (2013.01); *F25B 49/02* (2013.01); *F25D 21/04* (2013.01); *B60H 1/3226* (2013.01)

(58) Field of Classification Search
CPC .................................. B64F 1/362; B64F 1/364
See application file for complete search history.

(56) References Cited

U.S. PATENT DOCUMENTS

| 2,111,905 A | 3/1938 | Smith, Jr. et al. |
| 2,113,359 A | 4/1938 | Stebbins |

(Continued)

FOREIGN PATENT DOCUMENTS

| DE | 3314763 | 10/1984 |
| JP | 10-122607 | 5/1998 |

*Primary Examiner* — Ljiljana Ciric
*Assistant Examiner* — Alexis Cox
(74) *Attorney, Agent, or Firm* — Koppel, Patrick, Heybl & Philpott

(57) ABSTRACT

An air-conditioning unit including an air circuit with an air inlet, a main fan and an air outlet designed to be connected to a chamber, preferably via one or more flexible ducts, and a refrigerant circuit including a heat exchanger/evaporator positioned in the air circuit to cool the air by evaporating the refrigerant, a compressor and a condenser for condensing the refrigerant before it is returned to the heat exchanger/evaporator. The heat exchanger/evaporator includes several parallel circuits each having at least one regulator valve. The air circuit also includes a temperature probe downstream of the heat exchanger/evaporator and connected to a controller which controls the regulator valves to regulate the flow of refrigerant, and a pressure probe at the air outlet and connected to a regulator for regulating the speed and/or the power of the main fan so as not to exceed a maximum raised pressure at air outlet.

19 Claims, 4 Drawing Sheets

(51) Int. Cl.
*F24F 1/02* (2011.01)
*F25B 49/02* (2006.01)
*F25B 29/00* (2006.01)
*F25D 21/04* (2006.01)
*B60H 1/32* (2006.01)

(56) References Cited

U.S. PATENT DOCUMENTS

| | | | |
|---|---|---|---|
| 2,311,622 A | 2/1943 | Alexander et al. | |
| 2,630,688 A | 3/1953 | Merkling | |
| 2,746,372 A | 5/1956 | Shipman et al. | |
| 2,766,439 A | 10/1956 | Palm | |
| 3,150,498 A | 9/1964 | Blake | |
| 3,638,444 A | 2/1972 | Lindahl | |
| 3,777,506 A | 12/1973 | Hergatt et al. | |
| 3,786,859 A | 1/1974 | Day | |
| 4,101,100 A * | 7/1978 | Smith | A62C 33/06 104/275 |
| 4,450,900 A | 5/1984 | Nathan | |
| 4,539,823 A * | 9/1985 | Nishi | B60H 1/3205 165/43 |
| 4,540,118 A | 9/1985 | Lortie et al. | |
| 4,835,977 A | 6/1989 | Haglund et al. | |
| 4,888,958 A | 12/1989 | Ella | |
| 4,901,538 A | 2/1990 | Anthony | |
| 5,031,690 A | 7/1991 | Anderson et al. | |
| 5,094,598 A * | 3/1992 | Amata | F04B 39/0207 417/533 |
| 5,099,652 A | 3/1992 | Iida et al. | |
| 5,150,581 A | 9/1992 | Smith | |
| 5,335,507 A | 8/1994 | Powell | |
| 5,428,966 A | 7/1995 | Alsenz | |
| 5,706,664 A | 1/1998 | Hara | |
| 5,711,159 A * | 1/1998 | Whipple, III | F25D 29/00 62/186 |
| 5,987,907 A | 11/1999 | Morimoto et al. | |
| 6,405,549 B1 | 6/2002 | Baffes | |
| 6,490,877 B2 | 12/2002 | Bash et al. | |
| 6,792,767 B1 | 9/2004 | Pargeter et al. | |
| 7,389,649 B2 | 6/2008 | Pham et al. | |
| 7,461,516 B2 | 12/2008 | Leadingham et al. | |
| 7,520,142 B2 | 4/2009 | Saito et al. | |
| 7,651,052 B2 | 1/2010 | Delort | |
| 8,037,714 B2 * | 10/2011 | Mann, III | B64F 1/364 62/513 |
| 8,047,555 B2 * | 11/2011 | Mann, III | B64F 1/364 280/79.11 |
| 8,055,388 B2 * | 11/2011 | Mann, III | B64F 1/364 700/21 |
| 8,117,864 B2 * | 2/2012 | Montminy | B64F 1/364 62/419 |
| 2003/0061822 A1 | 4/2003 | Rafalovich | |
| 2004/0035130 A1 | 2/2004 | Amaral et al. | |
| 2004/0045308 A1 | 3/2004 | Field et al. | |
| 2004/0181921 A1 | 9/2004 | Alles | |
| 2004/0253918 A1 | 12/2004 | Ezell et al. | |
| 2005/0044861 A1 | 3/2005 | Cho, II | |
| 2005/0081551 A1 | 4/2005 | Dail | |
| 2005/0126190 A1 | 6/2005 | Lifson et al. | |
| 2005/0257560 A1 * | 11/2005 | Lee | F24F 1/0007 62/419 |
| 2006/0048539 A1 | 3/2006 | Takechi et al. | |
| 2006/0053811 A1 * | 3/2006 | Lifson | B60H 1/00885 62/196.3 |
| 2006/0144059 A1 | 7/2006 | Kang et al. | |
| 2006/0272342 A1 * | 12/2006 | Bash | F24F 11/0012 62/228.4 |
| 2006/0288719 A1 | 12/2006 | Shapiro et al. | |
| 2007/0034095 A1 | 2/2007 | McDonnell et al. | |
| 2007/0074528 A1 * | 4/2007 | Rodriguez | F25D 11/003 62/371 |
| 2007/0209383 A1 * | 9/2007 | Hutton | B64F 1/364 62/434 |
| 2008/0250800 A1 | 10/2008 | Wetzel | |
| 2009/0084120 A1 | 4/2009 | Meier et al. | |
| 2009/0107160 A1 | 4/2009 | Montminy et al. | |
| 2009/0107657 A1 | 4/2009 | Montminy et al. | |
| 2009/0112368 A1 * | 4/2009 | Mann, III | B64F 1/34 700/275 |
| 2009/0133416 A1 * | 5/2009 | Swofford | F25B 5/02 62/126 |
| 2010/0043467 A1 | 2/2010 | Kawano et al. | |
| 2010/0198415 A1 | 8/2010 | Kawano et al. | |
| 2011/0152982 A1 | 6/2011 | Richardson | |
| 2011/0162407 A1 | 7/2011 | Gist et al. | |
| 2012/0266624 A1 | 10/2012 | Inaba et al. | |
| 2013/0227985 A1 * | 9/2013 | Komano | F25B 1/00 62/404 |
| 2015/0259073 A1 * | 9/2015 | Dabaga | B64D 13/08 62/426 |

* cited by examiner

AIR-CONDITIONING UNIT AND METHOD

This is a Continuation application of U.S. patent application Ser. No. 12/301,357 filed Oct. 8, 2009, which is US National stage application of International Application PCT/EP2007/054840 filed May 18, 2007, which claims benefit of EP06114251.9 filed May 19, 2006.

The present invention relates to an air-conditioning unit and method for enclosures, such as aircraft parked on the ground.

It is often necessary to make conditioned air reach enclosures in order to maintain suitable parameters for the comfort of persons and animals, the functioning of equipment and/or the preservation of goods. Conditioned air means air where at least the temperature is maintained in a range substantially independent of the temperature of the ambient air. In particular, in aircraft parked on the ground, if onboard air-conditioning systems are not in operation, the temperature on board may rapidly become very uncomfortable for the passengers as well as the crew and/or damage onboard equipment, such as the onboard electronics. To prevent this, it is well known to persons skilled in the art to use air-conditioning units, possible mobile and/or autonomous, in order to bring conditioned air inside the aircraft, in particular through flexible ducts connecting the aircraft to at least one air outlet of the conditioned air unit, in order to maintain a suitable temperature in the cabin, and/or in the baggage and/or avionics holds. Such air-conditioning units have been described for example in the American patents U.S. Pat. Nos. 5,031,690 and 5,099,652, in the German patent application DE 33 14 763 A1, in Japanese patent application JP 10-122607 and in the American patent application US 2004/0045308 A1.

In particular, U.S. Pat. Nos. 5,031,690, 5,099,652 and DE 33 14 763 A1 disclose air-conditioning units comprising:
  an air circuit with an air inlet, a main fan and an air outlet adapted to be connected to an enclosure, such as for example an aircraft on the ground, preferably through one or more flexible ducts, and
  a refrigerant circuit comprising an exchanger/evaporator placed in the said air circuit in order to cool the air by evaporating the refrigerant, a compressor and a condenser for condensing the refrigerant before it is returned to the exchanger/evaporator.

In these units, an air-conditioning method may be implemented comprising the following steps:
  ambient air enters an air circuit propelled by a main fan,
  the said ambient air passes through an exchanger/evaporator, where it is cooled by evaporating a refrigerant flow circulating in the exchanger/evaporator,
  the said cooled air is propelled through an air outlet to a substantially closed space, such as for example an aircraft on the ground, preferably through one or more flexible ducts,
  the said refrigerant it compressed in a compressor downstream of the exchanger/evaporator,
  the said refrigerant is condensed in a condenser downstream of the compressor.

However, all these air-conditioning units have the drawback of being able to adapt the refrigeration power only within very limited ranges. Often, as described in the introduction to U.S. Pat. No. 5,099,652, the temperature of the air is simply regulated by alternating between a full-power refrigeration position and a zero refrigeration position. Although in this document, as well as DE 33 14 763 A1, it is proposed to regulate the refrigeration power by varying the power of the compressor. However, the efficacy of this regulation is limited by the fixed parameters of the exchanger/evaporator. For this reason, the existing air conditioning units and methods have limited adaptability to variations in environmental parameters, such as the temperature and humidity of the ambient air. This adaptability is also compromised by low efficiency outside optimum operating parameters and by the necessity to make complex manual adjustments in order to regulate the refrigeration power.

Another very important drawback of the conditioned air units of the prior art is their lack of adaptability to the parameters of the enclosures for which the conditioned air is intended. Each enclosure is characterised by an output/pressure curve that is particular to it. This characteristic may be fixed or change over time. The output/pressure curve of an enclosure may vary, for example, according to the size of the enclosure, other characteristics particular to the enclosure, circumstances of the connection environment, and certain variables over time, such as the opening or modification of the air distribution ducting in an enclosure such as an aircraft parked on the ground. However, the air-conditioning units of the prior art do not have means for adapting to such variations in the output/pressure curve.

This lack of adaptability is particularly problematic for air-conditioning units for aircraft parked on the ground. These aircraft may have extremely varied volumes and therefore very divergent flow rate/pressure curves. Each aircraft therefore has a set of characteristics that are particular to it in terms of flow rate and pressure. An air-conditioning unit intended for a small aircraft, such as for example a business jet, will not be able to deliver a conditioned air flow rate sufficient for a large aircraft, such as a large-capacity aircraft. Conversely, an air conditioning unit intended for a large-capacity aircraft will have a ventilation power such that, if it were connected to a business jet, the blow back of the small fuselage would cause an overpressure both in the business jet and in the flexible connection ducts such that they might be damaged.

In addition, in one and the same aircraft, this flowrate/pressure characteristic curve may change during the functioning of the unit according, for example, to a movement of the flexible connection ducts between the air conditioning unit and the aircraft, or by the opening and/or closing of valves on the internal air distribution system of the aircraft.

As the refrigeration power must be adapted to the flow rate of conditioned air, the reduced variability of the refrigeration power in the conditioned air units also determines their adaptability to enclosures with different flowrate/pressure curves.

Consequently, with the conditioned air units of the prior art, each airport must have a whole range of air-conditioning units specifically adapted to each size and even to each model of aircraft. Given the cost of each unit, this may therefore represent a very large amount of immobilised capital, with a considerable impact on the profitability of an airport.

An object of the present invention is therefore to provide an air conditioning unit and method with great adaptability both to the environmental parameters and to the different flowrate/pressure curves of the enclosures to be cooled without compromising the efficacy of the cooling.

To achieve this, in the air conditioning unit of the invention:
  the said exchanger/evaporator comprises several parallel circuits each with an individual pressure reducing valve, the said air circuit also comprises a temperature sensor downstream of the exchange/evaporator connected to means of controlling the said individual pressure reducing valves in order to regulate the flow rate of refrigerant in order to maintain the air temperature downstream of the exchanger/evaporator within a set range, and a pressure sensor at the air outlet connected to means of regulating the speed and/or power of the main fan in order not to exceed a maximum overpressure at the air outlet, and the said refrigerant circuit also comprises a compressor aspiration pressure sensor connected to means of regulating the mass flow rate of the compressor in order to maintain the aspiration pressure of the compressor within a set range.

In this way, the refrigeration power can be regulated through the flow rate of refrigerant in the exchanger/evaporator as a function of the air temperature downstream of the said exchanger/evaporator. As the said control means can open only the pressure reducing valves solely in the circuits of the exchanger/evaporator necessary for achieving the necessary refrigeration power, the flow rate of refrigerant in each of the open circuits can remain close to the optimum point. Under such conditions, the regulation of the mass flow rate of the compressor in order to maintain the aspiration pressure of the compressor within an optimum operating range makes it possible to reduce the refrigeration power delivered by the compressor when the pressure reducing valves of the exchanger/evaporator are closed. With the compressor working at low output, the energy consumption can be reduced. This regulation of the mass flow rate of refrigeration aspirated by the compressor can be operated in several ways. For example, in the case of a rotary compressor, such as for example a screw compressor, the flow rate can be regulated through the speed of rotation of the compressor. In screw compressors, it is also possible to regulate the flow rate by action on a capacity slide of the compressor modifying the useful length of the screw. Another way of regulating the flow rate, if the compressor comprises several compressor units installed in parallel, is by the regulation of the number of compressor units in operation. In a similar manner, in the case of a piston compressor comprising several cylinders, where each cylinder comprises at least one induction valve and at least one exhaust valve, it is possible to regulate the output of the compressor by acting on the said induction and exhaust valves, in a manner known to persons skilled in the art. Finally, it is also possible to regulate the output of the compressor by means of a bypass valve, generally external to the compressor.

In addition, the speed and/or power of the main fan can be regulated so as to produce the maximum conditioned air flow rate for each enclosure. As the temperature of the air downstream of the exchanger/evaporator will depend both on the refrigeration power and the flow rate of air to be cooled, this regulation, in combination with the regulation of the individual pressure reducing valves and the mass flow rate of refrigerant sucked in by the compressor cited above has the advantageous effect of automatically adjusting not only the flow rate of air but also the refrigeration power according to each space. It therefore becomes possible, for example, to use the same air-conditioning unit for a whole range of aircraft of different sizes, without having to proceed with complex manual adjustments for each appliance and keeping good efficiency in all circumstances.

Advantageously, the said air circuit also comprises a temperature sensor at the air outlet connected to means of regulating the speed and/or power of the main fan in order to control its flow rate so as to maintain the temperature at the air outlet within a set range. This makes it possible to regulate the temperature of the conditioned air through its flow rate.

Advantageously, the said condenser is an air-cooled condenser. This option is particularly simple and avoids means, such as for example water reservoirs, which will be difficult to adapt to a mobile and/or self-contained unit.

More advantageously, the said air-cooled condenser may comprise a cooling fan and a pressure sensor for the refrigerant connected to means of regulating the speed and/or power of the cooling fan in order to control the cooling of the condenser so as to maintain the pressure of the refrigerant in the condenser within a set range. This makes it possible to regulate the speed and/or power of the cooling fan in order to adapt it, amongst other things, to the changes in flow rate of refrigerant through the condenser and to maintain the condensation pressure.

Advantageously, the said exchanger/evaporator can also comprise a temperature sensor for the refrigerant at the output of each of the said parallel circuits connected to the said means of controlling the said pressure reducing valves in order to regulate the flow rate of refrigerant so as to ensure the evaporation of substantially all the flow of refrigerant in the said exchanger/evaporator. This makes it possible to possible to optimise the flow rate of refrigerant in each circuit of the exchanger/evaporator by allowing to flow in each circuit only the refrigerant that can be vaporised by the heat exchanged.

Even more advantageously, the said exchanger/evaporator can also comprise a pressure sensor for the refrigerant at the output of the said parallel circuits connected to the said means of controlling the said pressure reducing valves in order to correct the temperature sensed by the temperature sensor for the refrigerant at the discharge from the same parallel circuit.

Under conditions of high humidity, an excessive refrigeration power might cause the formation of frost on the surface of the exchanger/evaporator, interfering with and even blocking the flow of air through the exchanger/evaporator and therefore causing a breakdown of the air conditioning unit. To prevent this, the said exchanger/evaporator can advantageously also comprise a sensor for the surface temperature of the exchanger/evaporator connected to the said means of controlling the said pressure reducing valves in order to regulate the flow of refrigerant in order to prevent the formation of frost on the surface of the exchanger/evaporator. With this sensor connected to the means of controlling the pressure reducing valves, the refrigeration power can be regulated so as to maintain the temperature above a frost formation danger threshold.

Between the condenser and the exchanger/evaporator, heat sources can heat the flow of refrigerant. If the cooling in the condenser is regulated optimally, the temperature of the refrigerant should be just below the condensation temperature. A heating or a slight drop in pressure could therefore cause the formation of gas bubbles in the refrigerant that might compromise the optimum functioning of the air conditioning unit. For this reason, the refrigerant circuit may advantageously also comprise an economiser circuit downstream of the condenser, the said economiser circuit comprising a main branch, a secondary branch with a pressure reducing valve, and a heat exchanger between the said main branch and the said secondary branch downstream of its pressure reducing valve, so that, in operation, a secondary flow of refrigerant is diverted to the said secondary branch so as to be expanded in the pressure reducing valve and cool through the heat exchanger a primary flow of refrigerant passing through the main branch in order to prevent the appearance of gas bubbles in the refrigerant upstream of the exchanger/evaporator. By profiting from the evaporation heat of the secondary flow of refrigerant, it is possible to supercool the primary flow delivered to the exchanger/evaporator in order to prevent the formation of gas bubbles downstream of the exchanger/evaporator.

Advantageously, in order to provide the electrical supply to the air conditioning unit in self-contained mode, the unit may also comprise a thermal engine, preferably diesel, coupled to a generator.

Even more advantageously, the said thermal engine may comprise a cooling circuit for the engine with:
- a radiator, preferably with a fan, for cooling an engine cooling fluid;
- a complementary heat exchanger placed in the said air circuit, preferably downstream of the said exchanger/evaporator, in order to heat the air by cooling the engine cooling fluid, and
- a three-way valve for directing the cooling fluid for the engine alternately to the radiator or to the complementary heat exchanger.

The characteristics make it possible not only to discharge the heat produced by the functioning of the thermal engine but also if applicable to use this heat to heat the air-conditioning flow when the unit is functioning in heating mode.

Advantageously, the said air circuit may also comprise electric heating means, preferably downstream of the said exchanger/evaporator, with a set of electric elements, preferably wired in several stages, and a temperature sensor downstream of the heating means connected to means of controlling the said set of electric elements to regulate the heating power in order to maintain the air temperature downstream of the heating means within a set range. This allows functioning of the air conditioning unit in heating mode with fine regulation of the heating power.

Advantageously, the said refrigerant may be a hydrofluorocarbon, preferably R134a. Such a refrigerant affords good energy efficiency, with good safety and low environmental impact.

Advantageously, the said main fan may be a centrifugal fan. Such a fan can deliver a high flow of air with relatively small size.

Advantageously, the said compressor may be a screw compressor.

Advantageously the said unit may be mobile and autonomous in order for example to supply conditioned air to mobile platforms, such as aircraft on the ground.

Details concerning the invention are described below illustratively but non-restrictively, making reference to the drawings.

Figure 1:
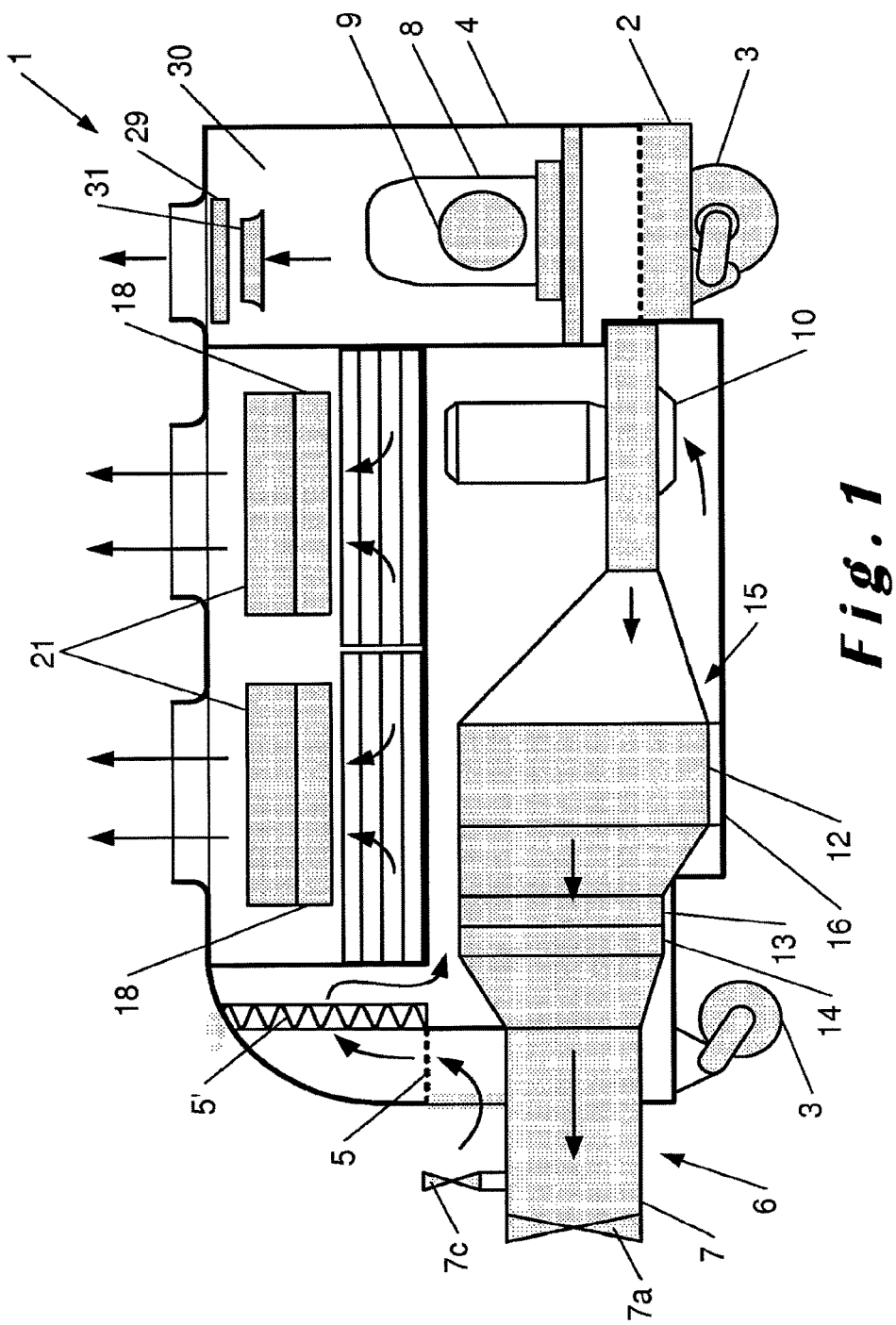
FIG. 1 depicts a side view of an air conditioning unit according to one embodiment of the invention.
Figure 2:
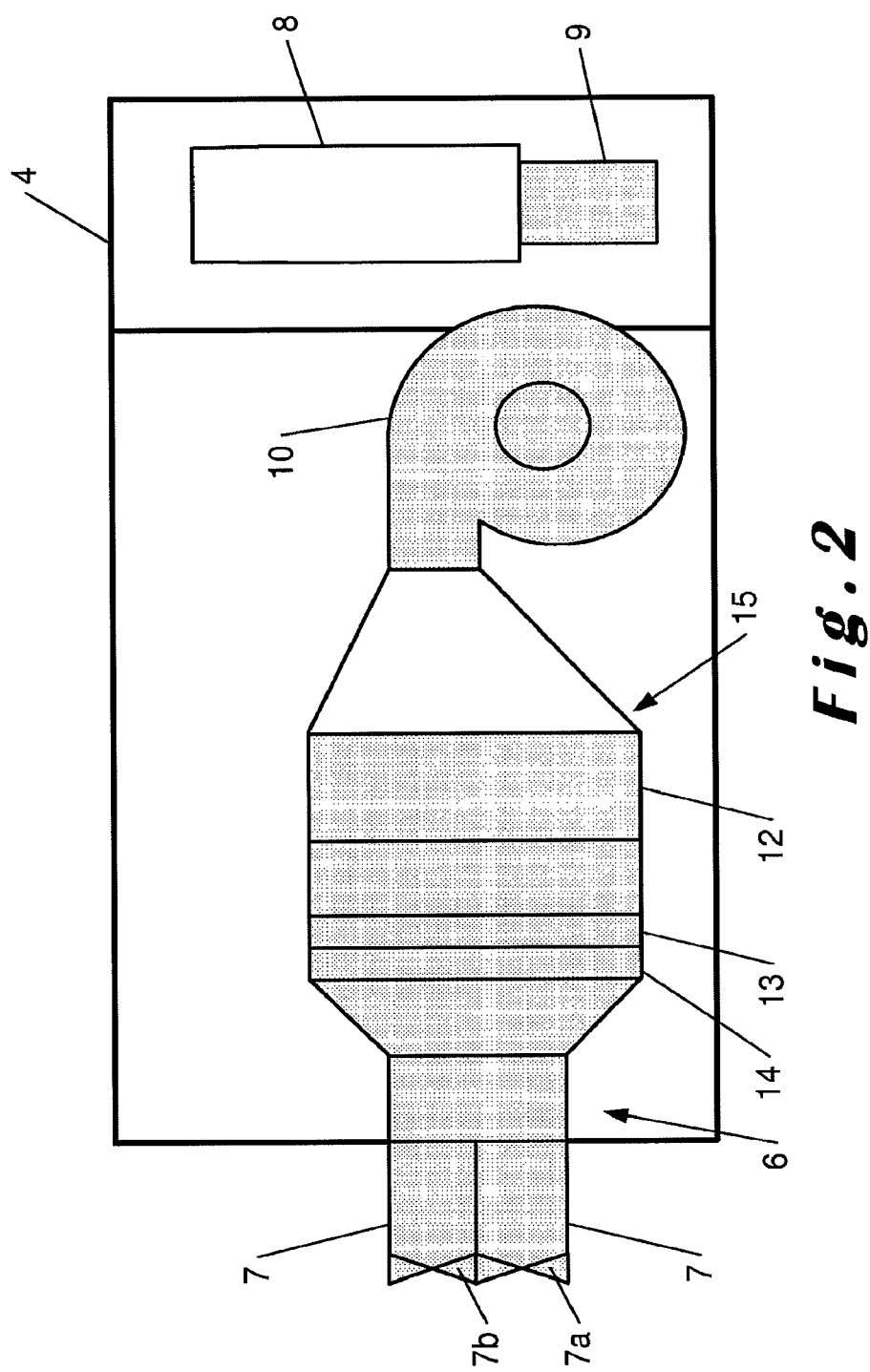
FIG. 2 depicts a plan view of the same air conditioning unit.

The air conditioning unit 1 for an aircraft illustrated in FIGS. 1 and 2 comprises a chassis 2 mounted on wheels 3, although it may alternatively be fixed, a body 4 provided with an air inlet 5 with filters 5', and an air outlet 6 with two discharge orifices 7 to which it is possible to connect flexible ducts to conduct the conditioned air to an aircraft and a system of valves 7a, 7b, 7c for opening and/or closing each of the two air orifices 7, and any diversion of the air to the atmosphere.

The unit 1 also comprises, inside the body 4, a diesel engine 8 coupled to an electrical generator 9 in order to provide the supply of electricity to the various elements of the unit 1, a variable-speed centrifugal fan 10 to distribute air to the aircraft, a refrigerant circuit 11 (depicted in FIG. 4) with an exchanger/evaporator 12 for cooling the air, electric heating means 13 with a plurality of electric elements, and a complementary heat exchanger 14 connected to the cooling circuit of the diesel engine 8.

In operation, the air intended for the aircraft is aspirated through the air inlet 5 and filters 5' by the centrifugal fan 10 that is situated inside the body 4 and functions in free aspiration. All the panels forming the body 4 thus form negative-pressure aspiration air duct.

After having passed through the fan 10, the air is directed to a pressure-resistant air treatment chamber 15 in which the exchanger/evaporator 12, the electric heating means 13 and the complementary heat exchanger 14 are found.

The unit 1 also comprises a tank 16 for collecting condensation water placed directly below the exchanger/evaporator 12 in order to collect the moisture from the aspirated air condensing on the exchanger/evaporator 12.

The cooled or heated air is then sent, via the two discharge orifices 7, to the flexible ducts and the aircraft.

Figure 3:
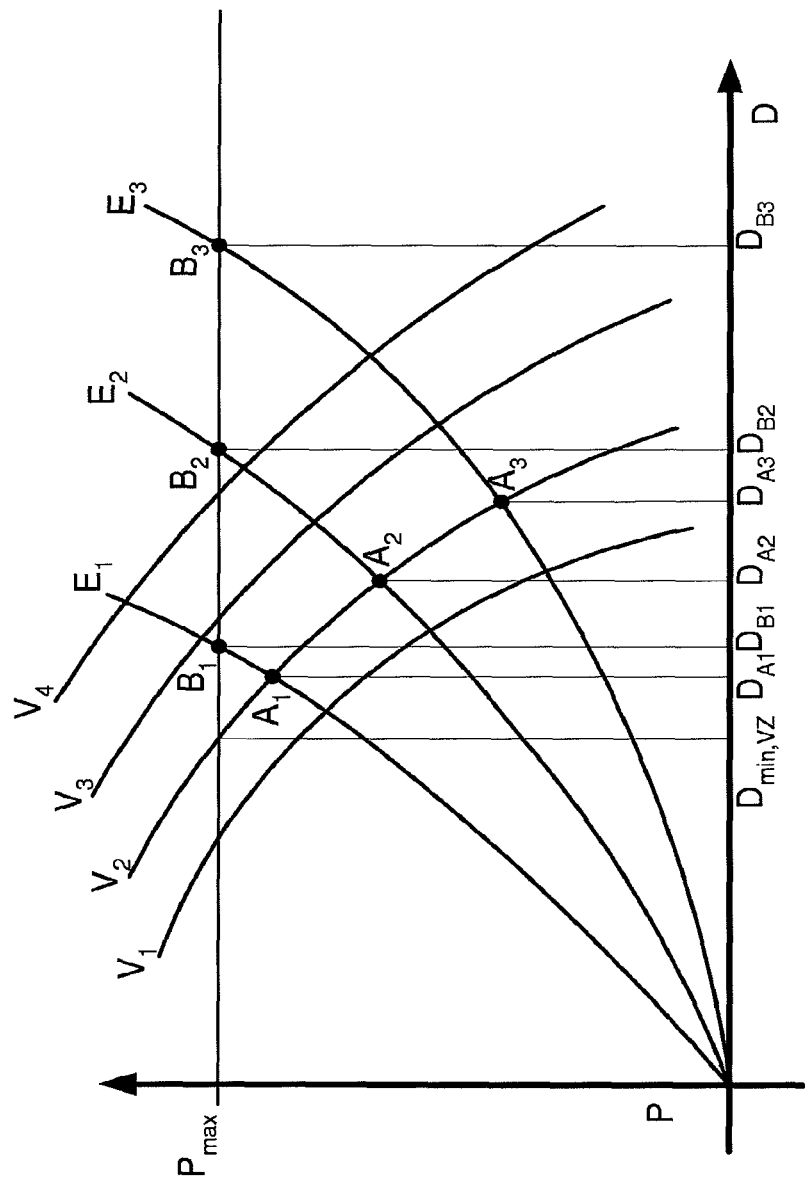
FIG. 3 is a pressure and flow rate diagram.

A pressure sensor SP1 continuously controls the discharge pressure of the fan 10 during operation. This sensor, by means of a frequency variator, makes the rotation speed of the fan 10 vary so that the latter delivers the maximum output possible without exceeding the maximum authorised pressure, in order to comply with the mechanical strength of the flexible ducts, the internal ducting of the aircraft and the air conditioning unit 1. This is illustrated in the diagram in FIG. 3. In this diagram, the vertical axis corresponds to the overpressure P at the air outlet 6 with respect to the pressure of the ambient air, with a maximum allowed overpressure Pmax, and the horizontal axis corresponds to the flow rate D. The curves E1, E2 and E3 are flow rate/pressure curves for enclosures with different characteristics. The curves V1, V2, V3 and V4 are flow rate/pressure curves for the same main fan 10 at different speeds. If the main fan 10 operates at a constant speed independently of the characteristics of the enclosure, the conditioned air flow will follow one of the curves V1, V2, V3 or V4. With, for example, the curve V2 the unit 1 will not be able to deliver a flow of conditioned air below Dmin, V2, below which the overpressure would exceed the maximum allowed overpressure Pmax, and would risk causing damage. On the other hand, the flow rate could increase only with a very substantial drop in the discharge overpressure of the enclosure. Thus the flow of conditioned air that could be delivered to the enclosures represented by the curves E1, E2 and E3 would be determined by the intersections A1, A2, A3 respectively of these curves with V2. With the regulation of the speed of the main fan 10 as a function of the maximum allowed overpressure Pmax, the flow rate is determined by the intersections B1, B2 and B3 of E1, E2 and E3 with Pmax. As can be seen in the diagram, the flow rates DB1, DB2 and DB3 resulting from this are substantially higher than the flow rates DA1, DA2 and DA3 of the fixed-speed fan.

Any modification to the air discharge system before the connection or during functioning results directly in a modification to the rotation speed of the fan 10 so that the air pressure remains within an acceptable range. Alternatively, the fan 10 could be power regulated, rather than speed-regulated.

A temperature sensor ST1 controlling the air output to the aircraft also influences the rotation speed of the fan 10, and/or its power, by preventing discharge into the aircraft of excessively hot air, in cooling mode, or too cold in heating mode. The reduction in the speed and/or power consequently makes it possible to reduce the refrigerant or heating load that the unit must deliver in cold mode or hot mode, respectively, in order to comply with its set value. In this way, the unit 1 can be used outside the design conditions without posing a problem with regard to the comfort afforded by the level of the air discharge temperature or the discomfort resulting from an excessively low discharge temperature.

Figure 4:
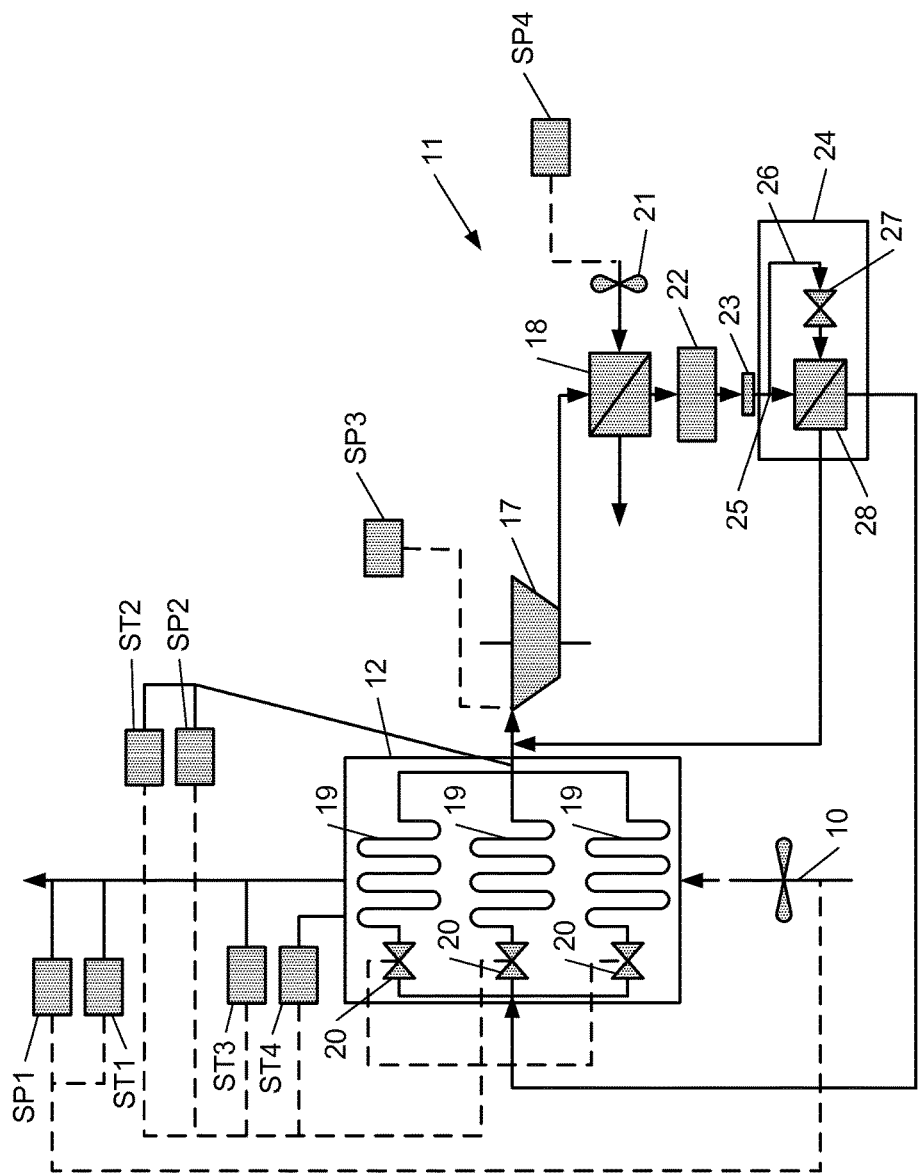
FIG. 4 depicts a diagram of the refrigerant circuit of the same air conditioning unit.

The cooling mode of the unit 1 is provided by a refrigerant circuit 11 based on the compression cycle and on the direct expansion of the refrigerant fluid. This circuit 11 is illustrated in FIG. 4.

The refrigerant fluid used is an HFC (hydrofluorocarbon) preferably R134a, in order to obtain better performance coefficients and ensure easy procurement of the refrigerant fluid, whilst complying with environmental constraints.

In cooling mode, the heat is taken off from the air treated by the evaporation of the refrigerant in the exchanger/evaporator 12. This heat, added to that produced by the compression in a compressor 17, is discharged to the environment during the condensation of the refrigerant in an air condenser 18.

The exchanger/evaporator 12 comprises a plurality of parallel circuits 19. Each parallel circuit 19 comprises, at its inlet, a pressure reducing valve 20 controlled electronically by a regulator. In this way, in operation, the refrigerant is expanded by one or more of these pressure reducing valves 20 according to the refrigeration load necessary. These pressure reducing valves 20 therefore have the particularity of adapting the flow rate of refrigerant to the refrigeration load strictly necessary.

The regulator for the pressure reducing valves 20 control several physical quantities:
  the superheating temperature of the refrigerant detected by a temperature sensor ST2 at the discharge from each of the circuits 19 in order to ensure that all the refrigerant present in the exchanger/evaporator 12 has evaporated before it is aspirated into the compressor 17;
  the air temperature detected by a temperature sensor ST3 downstream of the exchanger/evaporator 12 in order to check that this remains in the set range fixed;
  the surface temperature of the exchanger/evaporator 12 detected by a temperature sensor ST4, which gives information on the possible formation of frost on the exchanger/evaporator 12;
  the evaporation pressure detected by a pressure sensor SP2 in the exchanger/evaporator 12, which allows correction of the superheating temperature in order to have the exact value thereof.

At the discharge from the exchanger/evaporator 12, the refrigerant vaporised is aspirated at low pressure and compressed to a high pressure by the compressor 17.

In the embodiment illustrated the compressor 17 is of the screw type with continuous capacity regulation from 25% to 100%. However, in alternative embodiments, the compressor 17 could be a compressor of another type, such as for example a piston compressor.

The compressor 17 is driven by an electric motor integrated in the compressor 17, preferably in an accessible hermetic housing. This motor may be cooled by the aspirated refrigerant fluid.

A pressure sensor SP3 measures the suction pressure upstream of the compressor 17 and adapts the speed thereof by means of a regulator so that the rate of the aspirated flow adapts to the rate of the flow injected by the pressure reducing valves 20 in the exchanger/evaporator 12. In other embodiments, the rate of the flow aspirated by the compressor 17 could be regulated by other means, such as a capacity slide for varying the useful length of the screw in a screw compressor 17, the regulation of the number of active compressing units in a compressor 17 having several of these in parallel, a bypass valve, generally external or, in a piston compressor comprising several cylinders, the regulation of the number of active cylinders, possibly by controlling the induction and/or exhaust valves of the cylinders.

The refrigerant fluid leaving the compressor 17 is directed to the condenser 18.

The condenser 18 is of the air type. It is placed outside the body 4 and cooled by the ambient air propelled through the condenser 18 by a cooling fan 21. The cooling air for the condenser 18 circulates in a circuit substantially isolated at least from the conditioned air circuit in order to prevent the latter being contaminated.

To ensure for the condenser 18 a control allowing the latter to adapt to the refrigerant flow rate, the cooling fan 21 is controlled by a frequency variator connected to a pressure sensor SP4 (high pressure) in the condenser 18.

The condensation pressure can therefore be kept stable even under changing external conditions or during changes to the refrigerant flow rate.

A horizontal liquid reservoir 22 collects the refrigerant condensed in the condenser 18. A dehumidifying cartridge filter 23 placed at the output of the reservoir 22 removes any moisture present in the refrigerant.

Before the refrigerant is directed to the pressure reducing valves 20, it is supercooled in an economiser circuit 24.

This economiser circuit 24 comprises a main branch 25, a secondary branch 26 with a pressure reducing valve 27, and a heat exchanger 28 between the said main branch 25 and the said secondary branch 26 downstream of its pressure reducing valve 27. Part of the flow of refrigerant is diverted to the secondary branch 26 and vaporised by the pressure reducing valve 27 so as to cool the primary flow of refrigerant in the exchanger 28.

This secondary flow of refrigerant is expanded at an intermediate pressure between the high and low pressure of the compressor 17. The pressure reducing valve 27 is also electronically controlled. The primary flow of refrigerant passes through the exchanger 28 on the liquid refrigerant side, while supercooling by virtue of the evaporation of the secondary flow expanded at the intermediate pressure. The latter is then aspirated directly by the compressor 17.

The supercooling of the primary flow affords greater stability of functioning of the pressure reducing valves 20 of the exchanger/evaporator 12 while at all times providing a 100% liquid phase of the refrigerant at their inlet.

Variations in refrigeration loads or changes in external conditions may lead to the appearance of gas bubbles at the inlet to the pressure reducing valves 20, interfering with their functioning. By its presence, the economiser circuit 24 prevents this problem.

The heating mode of the unit 1 is provided by electrical heating means 30 comprising a set of electric elements.

The electric heating means 13 are placed in the air treatment chamber 15 also containing the exchanger/evaporator 12 downstream of it.

The electric heating means 13 are in the form of a set of stainless steel tubes without fins. They are wired in for example four different stages providing the possibility of delivering the heat capacity strictly necessary.

The temperature sensor ST1 controlling the output of the unit also makes it possible to regulate the electric means 13.

As the unit 1 of the embodiment illustrated is supplied by a self-contained electricity generator, a complementary heat exchanger 14 connected to the cooling circuit of the diesel engine 8 can also heat the treated air. This complementary heat exchanger 14 is of the type comprising copper tubes and aluminium fins and serves to recover the heat given off by the cooling circuit of the diesel engine 8.

According to the method of use of the unit 1, in cooling or heating mode, and the water temperature in the cooling circuit of the diesel engine 8, a three-way valve (not illustrated) in this cooling circuit makes it possible to direct the water circulating in the circuit to a radiator 29 discharging the heat to the environment or to the complementary heat exchanger 14 installed in the air treatment chamber 15 downstream of the exchanger/evaporator 12.

The diesel engine 8 is cooled by the circulation of water in its cooling circuit in the cylinder heads. The radiator 29 is preferably ventilated by means of an axial fan 31.

To comply with certain environmental constraints, it is preferable to use a diesel engine with combustion air cooling. An exchanger for cooling the combustion air, or intercooler, is then installed in the chassis of the radiator 29.

The diesel engine 8 has the following safety devices:
water high temperature
lack of oil pressure.

An electrical panel comprises the power and control circuit for the entire unit 1.

An automatic controller installed in the electrical panel manages the functioning of the unit 1 by controlling all the constituent elements, namely:
main fan 10,
compressor 17,
condenser 18,
pressure reducing valves 20 of the exchanger/evaporator 12,
pressure reducing valve 27 of the economiser circuit 24,
electric heating means 13,
three-way valve of the cooling circuit of the diesel engine 8.

A control panel comprises:
a start/stop button,
an operating mode selector (hot, cold ventilation),
a fault lamp,
an On lamp,
a display indicating the information useful to startup.

As soon as the ducts are connected between the unit 1 and the aircraft, the operator can start the diesel engine 8, or put the unit 1 otherwise under electrical tension, by action on the main start/stop button.

The diesel engine 8 is equipped with an automatic starting system.

As soon as an electrical voltage is present, the operator chooses the operating mode of the unit 1 (hot/cold/ventilation). From this moment, the unit 1 can function in a completely automatic fashion.

After the starting of the main fan 10, its speed increases until the pressure sensor SP1 at the air outlet 6 detects that the overpressure of the air propelled is substantially equal to Pmax. As from this moment, the pressure sensor SP1 acts on the variator of the main fan 10 in order to maintain the overpressure within limit operating conditions and maintain the maximum possible air flow at the main fan 10.

In cold mode, the pressure reducing valves 20 adapt the flow rate of refrigerant to the flow rate of air thus controlled so as to maintain the temperature of the air sensed by the temperature sensor ST3 downstream of the exchanger/evaporator 12 within a set range and the surface temperature of the exchanger/evaporator 12 sensed by the temperature sensor ST4 at a value at a value such as for example just above 0 degrees Celsius, preventing frosting of the exchanger/evaporator 12. Frosting of the exchanger/evaporator 12 may cause a loss of air flow and lead to the stoppage of the unit 1.

The modification to the flow rate of refrigerant influences, in operation, the aspiration pressure (low pressure of the refrigeration circuit). According to the reading of this pressure by the pressure sensor SP3, the capacity of the compressor 17 can be adapted to maintain this pressure within a set range ensuring optimum functioning of the unit 1.

The variation in the flow rate of refrigerant also influences the heat load to be given off at the condenser 18. To ensure stable functioning, the central automatic controller, by means of the frequency variator of the cooling fan 21 of the condenser 18, modifies the speed of the fan 21 according to the reading of the high-pressure sensor SP4.

Likewise, for the exchanger/evaporator 12, the pressure reducing valve 27 of the economiser circuit 24 adapts the diverted quantity of the main flow of refrigerant in order to ensure correct supercooling of the liquid refrigerant before it returns to the pressure reducing valves 20 of the exchanger/evaporator 12.

In heating mode, when it is present, the central automatic controller uses firstly the complementary exchanger 14 for reasons of energy saving. By controlling the three-way valve of the cooling circuit of the diesel engine 8, the central automatic controller sends part of the cooling water flow from the diesel engine 8 to the complementary exchanger 14 in order to heat the air propelled towards the appliance.

If the air temperature at discharge is too cold, the central automatic controller powers up the elements of the electric heating means by regulating the various stages up to the set value. This set value is a maximum value predefined according to the physical characteristics of the materials making up the unit 1, the connection ducts and the maximum pressures withstood by the aircraft onto which the unit 1 is connected.

When functioning in hot mode or cold mode, the central automatic controller manages the unit so that the latter functions continuously without the unit 1 stopping in safe mode. Apart from the hardware safety devices stopping the elements, the quantities that can stop the units completely are:
general excess current,
excess current on the main fan 10,
high condensation pressure (in cold mode),
high pressure of the propelled air.

In the case of risk of general excess current, a pre-alarm threshold before complete stoppage is detected. The central automatic controller then reduces the electrical consumption of the compressor 17 (in cold mode) or of the electric heating means 13 (in hot mode) by reducing the capacity of these by action on their regulation.

In the case of risk of excess current at the main fan 10, the electrical load of the motor of the main fan 10 is reduced by reducing its rotation speed.

In the case of risk of high condensation pressure, the refrigeration load of the compressor 17 is reduced by the central automatic controller by action on its regulation.

In the case of risk of overpressure of the propelled air, the rotation speed of the main fan 10 is reduced by means of the frequency variator.

These different situations lead to a reduction in the capacity of the unit 1 in order to maintain it in operation when the operating conditions are more severe than expected without exceeding the safety limits immediately stopping the unit 1.

Although the present invention has been described with reference to specific example embodiments, it is obvious that various modifications and changes can be made to these examples without departing from the general scope of the invention as defined by the claims. Consequently the description and drawings must be considered in an illustrative rather than restrictive sense.

REFERENCES OF THE FIGURES

1 Air conditioning unit
2 Chassis
3 Wheels
4 Body
5 Air inlet
5' Filters
6 Air outlet
7 Discharge orifices
7a Valve
7b Valve
7c Valve
8 Diesel engine
9 Electrical generator
10 Main fan
11 Refrigerant circuit
12 Exchanger/evaporator
13 Electric heating means
14 Complementary exchanger
15 Treatment chamber
16 Collection tank
17 Compressor
18 Condenser
19 Parallel circuits
20 Pressure reducing valves
21 Cooling fan
22 Horizontal refrigerant reservoir
23 Dehumidifying filter
24 Economiser circuit
25 Main branch
26 Secondary branch
27 Pressure reducing valve
28 Heat exchanger
29 Radiator
30 Engine compartment
31 Fan
A1 Intersection of flow rate/pressure curves V2 and E1
A2 Intersection of flow rate/pressure curves V2 and E2
A3 Intersection of flow rate/pressure curves V2 and E3
B1 Intersection of flow rate/pressure curve E1 and Pmax
B2 Intersection of flow rate/pressure curve E2 and Pmax
B3 Intersection of flow rate/pressure curve E3 and Pmax
D Air output
DA1 Air output at point A1
DA2 Air output at point A2
DA3 Air output at point A3
DB1 Air output at point B1
DB2 Air output at point B2
DB3 Air output at point B3
E1 Flow rate/pressure curve of a first enclosure
E2 Flow rate/pressure curve of a second enclosure
E3 Flow rate/pressure curve of a third enclosure
P Overpressure of conditioned air at air outlet
Pmax Maximum overpressure
SP1 Pressure sensor
SP2 Pressure sensor
SP3 Pressure sensor
SP4 Pressure sensor
ST1 Temperature sensor
ST2 Temperature sensor
ST3 Temperature sensor
ST4 Temperature sensor
V1 Flow rate/pressure curve of a first fan speed
V2 Flow rate/pressure curve of a second fan speed
V3 Flow rate/pressure curve of a third fan speed
V4 Flow rate/pressure curve of a fourth fan speed

I claim:

1. An air conditioning unit comprising:
a housing;
an air inlet formed in the housing, the air inlet being configured to be connected to air outside of the housing;
an air outlet from the housing,
a flexible duct connected to the air outlet, the flexible duct being configured for connection to each of any one of a plurality of different aircraft, each aircraft having predetermined pressure and flow rate characteristics;
an outlet temperature sensor located at the air outlet;
an air treatment chamber located within the housing between the air inlet and the air outlet;
an exchanger-evaporator configured for cooling air passing through the air treatment chamber, the exchanger-evaporator including a plurality of parallel circuits, each circuit including an individually controllable pressure reducing valve configured for regulating the flow rate of refrigerant through the exchanger-evaporator;
a compressor configured for supplying refrigerant to each circuit of the exchanger-evaporator, the flow rate of refrigerant being determined based on the temperature sensed by the outlet temperature sensor;
a fan located in the body and configured for drawing air from the air inlet, through the air treatment chamber and to the air outlet, the fan being configured to be controlled to produce an air conditioned flow rate based on the predetermined pressure and flow rate characteristics of the particular aircraft to which air conditioning is to be supplied; and
a controller configured for controlling one or more of the individually controllable pressure reducing valves based on the temperature sensed by the outlet temperature sensor to adjust automatically refrigeration power supplied to the aircraft to which the air conditioning unit is connected, the refrigeration power being determined based on the pressure and airflow characteristics of the aircraft.

2. The air conditioning unit according to claim 1, further comprising a regulator configured for adjusting aspirated flow rate through the compressor to match the flow rate of refrigerant through the individually controllable pressure reducing valves.

3. The air conditioning unit according to claim 1, wherein the exchanger-evaporator is located within the air treatment chamber.

4. The air conditioning unit according to claim 1, further comprising a heater configured for heating air passing through the air treatment chamber.

5. The air conditioning unit according to claim 4, wherein the heater is located within the air treatment chamber.

6. The air conditioning unit according to claim 4, wherein the heater comprises a set of electric elements.

7. The air conditioning unit according to claim 6, wherein the set of electric elements is wired as a plurality of different stages, each stage being configured for being regulated by the controller to power up elements in that stage up to a set value to deliver the necessary heat capacity.

8. The air conditioning unit according to claim 1, wherein the compressor is configured to be regulated to control mass flow rate through the compressor and to maintain aspiration pressure of the compressor within an optimum operating range.

9. The air conditioning unit according to claim 1, wherein the unit is configured to be connected to an external electrical supply.

10. The air conditioning unit according to claim 1, further comprising an economiser circuit configured for cooling the refrigerant before it is directed to the individually controllable pressure reducing valves.

11. The air conditioning unit according to claim 10, wherein the economiser circuit comprises a primary branch, a secondary branch having an economiser pressure reducing valve, and a heat exchanger between the primary branch and the secondary branch downstream of the economiser pressure reducing valve, and wherein the economiser pressure reducing valve is configured for vaporising refrigerant flow in the secondary branch to cool refrigerant flow in the primary branch through the heat exchanger.

12. The air conditioning unit according to claim 1, wherein the exchanger-evaporator further comprises a temperature sensor configured for sensing the surface temperature thereof, the temperature sensor being connected to the controller to regulate the flow of refrigerant through the one or more individually controllable pressure reducing valves to prevent the formation of frost on the surface of the exchanger-evaporator.

13. A method of air conditioning an aircraft having predetermined pressure and airflow rate characteristics, the method comprising:
   providing a flexible duct connectible to an air outlet of an air conditioning unit, the flexible duct being configured for connection to each of any one of a plurality of different aircraft, each of said plurality of different aircraft having predetermined pressure and flow rate characteristics;
   connecting a first end of the flexible duct to the air outlet of the air conditioning unit;
   connecting a second end of the flexible duct to one of the any one of the plurality of aircraft; each aircraft having predetermined pressure and flow rate characteristics;
   drawing air from an air inlet of the air conditioning unit, through an air treatment chamber within the air conditioning unit and to the air outlet of the air conditioning unit, the air inlet of the air conditioning unit being configured to receive air from outside of the aircraft;
   cooling air passing through the air treatment using an exchanger-evaporator which includes a plurality of parallel circuits, each circuit including an individually controllable pressure reducing valve;
   supplying refrigerant to one or more of the parallel circuits of the exchanger-evaporator;
   sensing the temperature of the air outlet;
   controlling one or more individually controllable pressure reducing valves in respective ones of the one or more parallel circuits of the exchanger-evaporator based on the sensed temperature of the air outlet to adjust automatically refrigeration power supplied to the aircraft; and
   controlling a fan to produce an air conditioned flow rate based on the predetermined pressure and airflow rate characteristics of the aircraft.

14. The method according to claim 13, further comprising adjusting aspirated flow rate through a compressor to match the flow rate of refrigerant through the individually controllable pressure reducing valves.

15. The method according to claim 14, further comprising regulating mass flow rate of the compressor to maintain aspiration pressure within an optimum operating range.

16. The method according to claim 13, further comprising cooling the refrigerant before directing it to the individually controllable pressure reducing valves.

17. The method according to claim 13, further comprising sensing the surface temperature of the exchanger-evaporator and preventing the formation of frost on the surface of the exchanger-evaporator by regulating the flow of refrigerant through the individually controllable pressure reducing valves based on the sensed temperature.

18. The method according to claim 13, wherein the step of controlling the fan comprises adjusting at least one of the speed and power of the fan based on the predetermined pressure and airflow rate characteristics of the aircraft.

19. The method according to claim 16, further comprising vaporising refrigerant in a secondary branch of a heat exchanger to cool refrigerant flow in a primary branch of the heat exchanger.

* * * * *